US010094559B2

United States Patent
Muto et al.

(10) Patent No.: US 10,094,559 B2
(45) Date of Patent: Oct. 9, 2018

(54) REGENERATION ROTARY KILN

(71) Applicants: TAKASAGO INDUSTRY CO., LTD., Toki (JP); JAPAN FINE CERAMICS CENTER, Nagoya-shi (JP)

(72) Inventors: Norio Muto, Toki (JP); Motoharu Suzuki, Toki (JP); Toshiki Nakamura, Toki (JP); Satoshi Kitaoka, Nagoya (JP); Masashi Wada, Nagoya (JP); Kazuhiko Kawai, Nagoya (JP); Kazumi Hayashi, Nagoya (JP)

(73) Assignees: TAKASAGO INDUSTRY CO., LTD., Toki-shi (JP); JAPAN FINE CERAMICS CENTER, Nagoya-shi (JP)

(*) Notice: Subject to any disclaimer, the term of this patent is extended or adjusted under 35 U.S.C. 154(b) by 448 days.

(21) Appl. No.: 14/902,273

(22) PCT Filed: Oct. 2, 2014

(86) PCT No.: PCT/JP2014/076430
§ 371 (c)(1),
(2) Date: Dec. 30, 2015

(87) PCT Pub. No.: WO2016/051572
PCT Pub. Date: Apr. 7, 2016

(65) Prior Publication Data
US 2016/0305649 A1 Oct. 20, 2016

(51) Int. Cl.
*F23G 5/027* (2006.01)
*F23G 5/46* (2006.01)
(Continued)

(52) U.S. Cl.
CPC .............. *F23G 5/0273* (2013.01); *C08J 11/14* (2013.01); *F23G 5/033* (2013.01); *F23G 5/16* (2013.01);
(Continued)

(58) Field of Classification Search
CPC .............. C10B 47/30; B29B 2017/0496; F23G 5/0273; F23G 5/16; F23G 7/12
See application file for complete search history.

(56) References Cited

U.S. PATENT DOCUMENTS

| 5,935,387 A | 8/1999 | Tratz et al. |
| 2014/0120026 A1* | 5/2014 | Itazu .................. C08J 11/12 423/447.1 |
| 2016/0039118 A1 | 2/2016 | Gehr |

FOREIGN PATENT DOCUMENTS

| EP | 2 752 445 A1 | 7/2014 |
| EP | 2 783 764 A1 | 10/2014 |

(Continued)

OTHER PUBLICATIONS

International Search Report and Written Opinion (with partial English translation) dated Jan. 6, 2015 for PCT/JP2014/076430 filed on Oct. 2, 2014.

(Continued)

*Primary Examiner* — David J Laux
(74) *Attorney, Agent, or Firm* — Oblon, McClelland, Maier & Neustadt, L.L.P.

(57) ABSTRACT

Provided is a regeneration rotary kiln capable of reducing the proportion of combustible gas in waste gas and capable of reducing cost for generating superheated steam.
A regeneration rotary kiln (1) is characterized by including: a superheated steam generation unit (2) that generates superheated steam; a tube (3) capable of rotating about its axis and having a heating section (A) where, while the superheated steam is being supplied thereto, carbon fiber reinforced
(Continued)

plastic (10) containing a matrix resin and carbon fibers is heated to generate combustible gas (10G) from the matrix resin to extract the carbon fibers (10S) from the carbon fiber reinforced plastic (10); a first combustion chamber (43a) that is placed outside the tube (3) and that burns the gas (10G) introduced from the heating section (A) to heat the heating section (A); and a second combustion chamber (43b) that burns the gas (10G) introduced from the first combustion chamber (43a) to supply heat for generating the superheated steam.

7 Claims, 2 Drawing Sheets

(51) Int. Cl.
| | |
|---|---|
| *F23G 7/12* | (2006.01) |
| *F27B 7/20* | (2006.01) |
| *F23G 7/00* | (2006.01) |
| *F23G 5/20* | (2006.01) |
| *F23G 5/16* | (2006.01) |
| *F23G 5/033* | (2006.01) |
| *F27D 17/00* | (2006.01) |
| *C08J 11/14* | (2006.01) |

(52) U.S. Cl.
CPC ............... *F23G 5/20* (2013.01); *F23G 5/46* (2013.01); *F23G 7/00* (2013.01); *F23G 7/12* (2013.01); *F27B 7/20* (2013.01); *F27D 17/00* (2013.01); *Y02P 10/283* (2015.11); *Y02P 70/625* (2015.11); *Y02W 30/622* (2015.05); *Y02W 30/703* (2015.05); *Y02W 30/704* (2015.05)

(56) References Cited

FOREIGN PATENT DOCUMENTS

| | | |
|---|---|---|
| JP | 2003-334529 A | 11/2003 |
| JP | 2004-340448 A | 12/2004 |
| JP | 2013-147545 A | 8/2013 |
| JP | 2013-199607 A | 10/2013 |
| JP | 2013-224357 A | 10/2013 |
| WO | WO 2009/054034 A1 | 4/2009 |

OTHER PUBLICATIONS

Extended European Search Report dated Apr. 12, 2017, in European Patent Application No. 14895490.2.

* cited by examiner

REGENERATION ROTARY KILN

TECHNICAL FIELD

The present invention relates to regeneration rotary kilns that recover carbon fibers from carbon fiber reinforced plastic.

BACKGROUND ART

Carbon fiber reinforced plastic (hereinafter simply referred to as "CFRP") having carbon fibers dispersed in a matrix resin are used in various applications such as aircrafts, automobiles, railroad vehicles, and other industrial machines due to their light weight and high strength, and there is a growing demand for CFRP. There is an increasing amount of remnants resulting from a CFRP production process and waste after the use of CFRP. Currently, waste is disposed by landfill etc. However, if the demand for CFRP continues to grow, waste disposal will be a big issue. For example, for the landfill that is currently used, it will be difficult to secure the landfill sites, and cost for landfill will also be an issue.

The matrix resin of CFRP is hydrolyzed and pyrolyzed by superheated steam. Combustible gas is thus generated from the matrix resin. Patent Document 1 discloses a method for gasifying a matrix resin of waste (CFRP) and recovering carbon fibers from the waste. The method described in Patent Document 1 can reduce the volume of the waste. The method described in Patent Document 1 can also reduce cost for heating the CFRP by heating a processing tube by heat from combustion of the gas.

RELATED ART DOCUMENTS

Patent Documents

Patent Document 1: Japanese Patent Application Publication No. 2013-199607 (JP 2013-199607 A)

SUMMARY OF THE INVENTION

Problem to be Solved by the Invention

However, in the recovery method described in Patent Document 1, excess combustible gas (specifically, an unburned part of the gas) is burned by an afterburner in order to prevent environmental pollution. Heat from the combustion of the gas is therefore wasted. Moreover, in the recovery method described in Patent Document 1, an oil burning heating method etc. is used as heating means for generating superheated steam. This increases cost for generating the superheated steam. It is an object of the present invention to provide a regeneration rotary kiln capable of reducing the proportion of combustible gas in waste gas and capable of reducing cost for generating superheated steam.

Means for Solving the Problem (1) In order to solve the above problems, a regeneration rotary kiln according to the present invention includes: a superheated steam generation unit that generates superheated steam; a tube capable of rotating about its axis and having a heating section where, while the superheated steam is being supplied thereto, carbon fiber reinforced plastic containing a matrix resin and carbon fibers is heated to generate combustible gas from the matrix resin to extract the carbon fibers from the carbon fiber reinforced plastic; a first combustion chamber that is placed outside the tube and that burns the gas introduced from the heating section to heat the heating section; and a second combustion chamber that burns the gas introduced from the first combustion chamber to supply heat for generating the superheated steam, wherein the regeneration rotary kiln recovers the carbon fibers from the carbon fiber reinforced plastic.

According to the regeneration rotary kiln of the present invention, the carbon fibers can be continuously recovered. The CFRP can be stirred by rotation of the tube. The recovered carbon fibers can therefore have uniform quality.

In the heating section, the CFRP is heated while being exposed to the superheated steam. The matrix resin in the CFRP is hydrolyzed and pyrolyzed by water vapor and heat of the superheated steam and heat of the first combustion chamber. The matrix resin is thus decomposed into a low molecular weight matrix resin and gasified. The gas thus generated is combustible. The combustible gas is introduced from the heating section into the first combustion chamber and burns in the first combustion chamber. The heating section in the tube can be heated by heat from the combustion of the gas. According to the regeneration rotary kiln of the present invention, the combustible gas generated from the matrix resin can thus be used to heat the CFRP. Cost for heating the CFRP can therefore be reduced.

The combustible gas remaining unburned in the first combustion chamber (specifically, an unburned part of the gas) is introduced from the first combustion chamber into the second combustion chamber and is burned in the second combustion chamber. Heat from the combustion of the gas is used to generate the superheated steam. That is, the heat from the combustion of the gas is used in at least a part of a superheated steam generation process of "water→boiling water→wet steam→saturated steam→superheated steam." According to the regeneration rotary kiln of the present invention, the gas introduced from the first combustion chamber into the second combustion chamber can thus be used to generate the superheated steam. Cost for generating the superheated steam can therefore be reduced. Moreover, the amount of unburned combustible gas can be reduced. The proportion of the combustible gas in waste gas from the regeneration rotary kiln can also be reduced. This can suppress environmental pollution from the combustible gas.

The first combustion chamber and the second combustion chamber communicate with each other, but are independent of each other. The first combustion chamber and the second combustion chamber can therefore be controlled independently of each other. For example, the temperature in the first combustion chamber and the temperature in the second combustion chamber can be individually controlled.

(2) In the configuration of (1), it is preferable that the superheated steam generation unit have a waste heat recovery boiler that heats water to generate steam, and a supply tube that couples the waste heat recovery boiler and the tube via the second combustion chamber and that heats the steam to generate the superheated steam, and the steam in the supply tube be heated by the heat of the second combustion chamber which is transmitted through a wall of the supply tube.

According to this configuration, steam can be generated from the water in the waste heat recovery boiler. Superheated steam can be generated from the steam in the supply tube by using the heat of the second combustion chamber.

(3) In the configuration of (2), it is preferable that the waste heat recovery boiler burn the gas introduced from the second combustion chamber to heat the water to generate the steam.

According to this configuration, steam can be generated from the water in the waste heat recovery boiler by using heat from combustion of the combustible gas remaining unburned in the second combustion chamber (specifically, an unburned part of the gas).

(4) In the configuration of (2), it is preferable that the waste heat recovery boiler heat the water by heat of the gas introduced from the second combustion chamber to generate the steam.

According to this configuration, steam can be generated from the water in the waste heat recovery boiler by using heat retained by the gas burned in the second combustion chamber.

(5) In the configuration of any one of (1) to (4), it is preferable that the second combustion chamber be placed next to the first combustion chamber.

According to this configuration, the first combustion chamber and the second combustion chamber are placed next to each other. The temperature of the gas is therefore less likely to decrease when the gas is introduced from the first combustion chamber into the second combustion chamber. The first combustion chamber can be heated by heat from combustion of the gas in the second combustion chamber. That is, the heating section can be heated by the heat from the combustion of the gas in the second combustion chamber via the first combustion chamber. Moreover, installation space for the regeneration rotary kiln can be reduced.

(6) In the configuration of any one of (1) to (5), it is preferable that the regeneration rotary kiln further include: a gas supply unit that supplies nitrogen gas into the tube.

According to this configuration, entry of air (oxygen) into the tube can be suppressed. That is, oxidization of the carbon fibers in the tube can be suppressed. Since the nitrogen gas is added to the superheated steam, adhesion (bonding) between the recovered carbon fibers and the matrix resin can be improved.

(6-1) In the configuration of (6), it is preferable that the nitrogen gas be supplied into the tube from an upstream side thereof.

If the nitrogen gas is supplied into the tube from a downstream side thereof (this is also included in the configuration of (1)), the carbon fibers having passed through the heating section tend to scatter in the tube by the gas flow that is produced when the nitrogen gas is supplied. Moreover, the carbon fibers having passed through the heating section are forced back to the upstream side of the tube by the gas flow. A part of the carbon fibers which has been forced back into the heating section of the tube is further heated. Thermal history of the carbon fibers recovered from the tube therefore tends to vary. Accordingly, quality of the recovered carbon fibers tends to vary.

On the other hand, according to this configuration, the carbon fibers having passed through the heating section are less likely to scatter in the tube by the gas flow that is produced when the nitrogen gas is supplied. Moreover, the carbon fibers having passed through the heating section are unlikely to be forced back to the upstream side of the tube by the gas flow. Thermal history of the carbon fibers recovered from the tube is therefore less likely to vary. Accordingly, the recovered carbon fibers can have uniform quality.

According to this configuration, the CFRP can be reliably exposed to the nitrogen gas from the beginning of the processing of the CFRP in the heating section. Accordingly, adhesion (bonding) between the recovered carbon fibers and the matrix resin can be reliably improved.

(7) In the configuration of any one of (1) to (6), it is preferable that the regeneration rotary kiln further include: a recovery unit that is placed on a downstream side of the tube and that recovers the carbon fibers extracted in the tube, and the superheated steam generation unit heat the recovery unit.

According to this configuration, condensation on the extracted carbon fibers and on an inner surface of the recovery unit can be suppressed. That is, adhesion of the carbon fibers to the inner surface of the recovery unit due to condensation can be suppressed. This can improve capability of carrying the carbon fibers.

(8) In the configuration of (7), it is preferable that the recovery unit have a classification unit that classifies the carbon fibers.

Of the recovered carbon fibers, those having a short fiber length are reused for, e.g., injection molding of resins etc., and those having a long fiber length are reused for nonwoven fabric etc. The reuse applications of the recovered carbon fibers are thus sometimes determined based on the fiber length. It is therefore useful for reusing the carbon fibers to classify the recovered carbon fibers by the fiber length. In this respect, the recovery unit in the above configuration includes the classification unit. According to this configuration, the carbon fibers recovered from the tube can be classified by the fiber length.

(9) In the configuration of any one of (1) to (8), it is preferable that the regeneration rotary kiln further include: a cutting unit that is placed on an upstream side of the tube and that cuts the carbon fiber reinforced plastic into pieces of a predetermined size.

According to this configuration, the CFRP can be cut into pieces of a size suitable for being placed into the tube. Moreover, the size of the CFRP can be adjusted by cutting. For example, cutting the CFRP into pieces of a fixed size can achieve uniform processing of the CFRP in the tube. This can stabilize quality of the recovered carbon fibers.

Effects of the Invention

According to the present invention, a regeneration rotary kiln can be provided which is capable of reducing the proportion of combustible gas in waste gas and capable of reducing cost for generating superheated steam.

MODES FOR CARRYING OUT THE INVENTION

Embodiments of a regeneration rotary kiln of the present invention will be described below.

First Embodiment

[Configuration of Regeneration Rotary Kiln]

Figure 1:
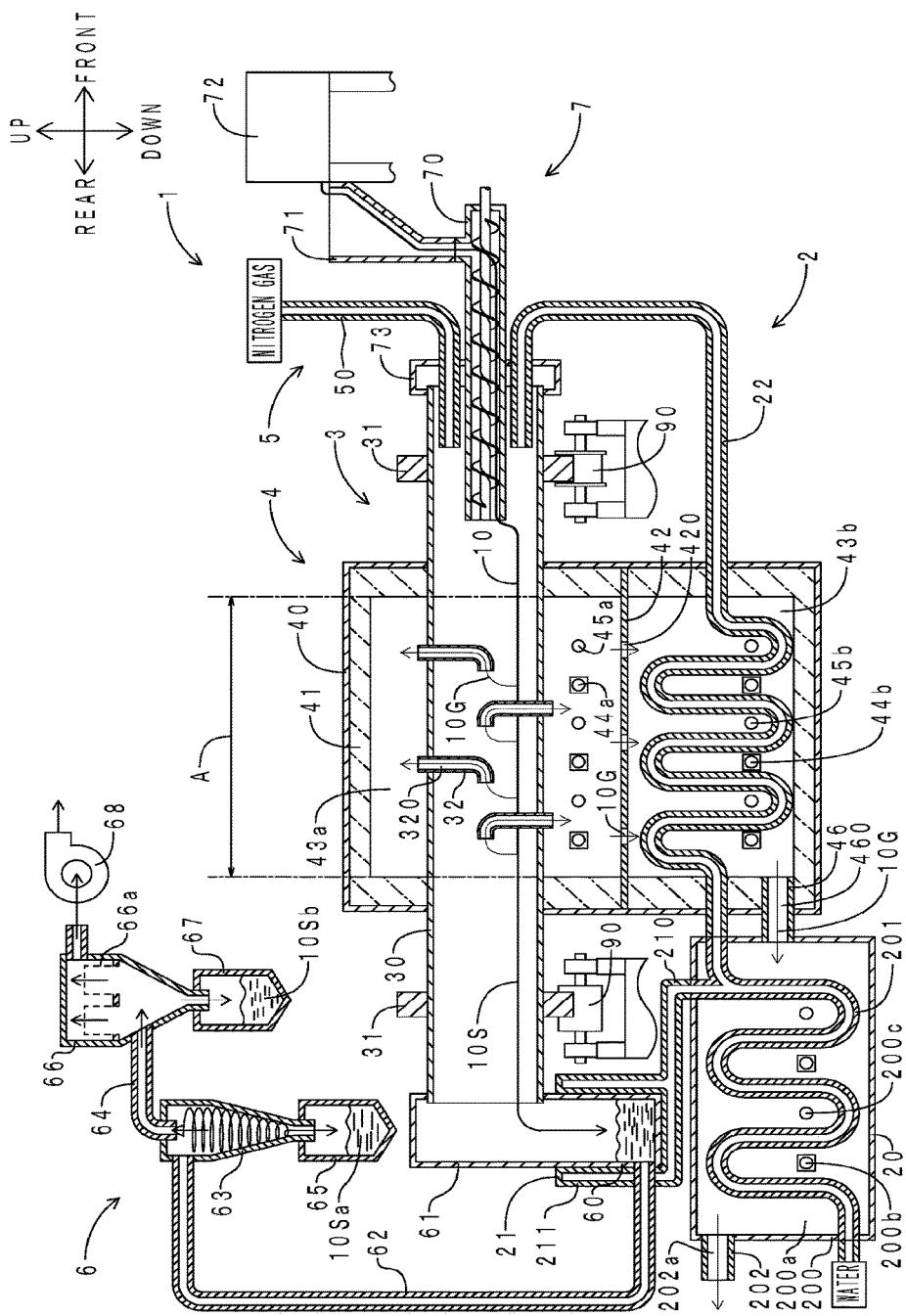
FIG. 1 is a longitudinal section of a regeneration rotary kiln according to a first embodiment.

First, the configuration of a regeneration rotary kiln of the present embodiment will be described. FIG. 1 is a longitudinal (front-rear direction) section of the regeneration rotary kiln of the present embodiment. As shown in FIG. 1, a regeneration rotary kiln 1 includes a superheated steam generation unit 2, a tube 3, a combustion unit 4, a gas supply unit 5, a recovery unit 6, a supply unit 7, and two pairs of rollers 90 or front and rear pairs of rollers 90.

(Combustion Unit 4)

The combustion unit 4 includes an outer wall 40, a thermal insulation material 41, a partition wall 42, a first combustion chamber 43a, a second combustion chamber 43b, a plurality of first burners 44a, a plurality of second burners 44b, a plurality of first air supply tubes 45a, a plurality of second air supply tubes 45b, and a connection cylinder 46.

The outer wall 40 has the shape of a rectangular box. The thermal insulation material 41 is stacked on the inner side of the outer wall 40. The partition wall 42 divides the internal space of the thermal insulation material 41 into two chambers, namely upper and lower chambers. That is, the partition wall 42 divides the internal space of the thermal insulation material 41 into the upper chamber or the first combustion chamber 43a and the lower chamber or the second combustion chamber 43b. The partition wall 42 has a plurality of second passages 420. The second passages 420 couple the first combustion chamber 43a and the second combustion chamber 43b in the up-down direction. The plurality of first burners 44a and the plurality of first air supply tubes 45a are placed in the first combustion chamber 43a. Fuel gas (e.g., propane gas) and air are supplied to the first burners 44a. Air is supplied to the first air supply tubes 45a. The plurality of second burners 44b and the plurality of second air supply tubes 45b are placed in the second combustion chamber 43b. Fuel gas (e.g., propane gas) and air are supplied to the second burners 44b. Air is supplied to the second air supply tubes 45b. The connection cylinder 46 connects the combustion unit 4 and a waste heat recovery boiler 20 described below. A third passage 460 is located inside the connection cylinder 46. The third passage 460 communicates with the second combustion chamber 43b.

(Tube 3, Rollers 90)

The tube 3 includes a furnace core tube 30, a pair of front and rear tires 31, and a plurality of connection tubes 32. The furnace core tube 30 has a cylindrical shape. The furnace core tube 30 is disposed substantially horizontally. The furnace core tube 30 is tilted downward from the front side (the upstream side in the direction in which CFRP 10 described below is carried) closer to the rear side (the downstream side in the direction in which the CFRP 10 described below is carried). The furnace core tube 30 extends through the upper part of the combustion unit 4, specifically the first combustion chamber 43a, in the front-rear direction (the axial direction). A heating section A is set inside (radially inward of) the furnace core tube 30 (a part exposed to the first combustion chamber 43a).

Each of the plurality of connection tubes 32 has an L-shape. The connection tubes 32 extend through a peripheral sidewall of the furnace core tube 30. One ends (the upstream ends in the direction in which gas 10G described below flows) of the connection tubes 32 are placed in the center in the radial direction of the furnace core tube 30. The one ends of the connection tubes 32 are open rearward. The other ends (the downstream ends in the direction in which the gas 10G described below flows) of the connection tubes 32 are placed radially outward of the furnace core tube 30. The other ends of the connection tubes 32 are open in the first combustion chamber 43a. A first passage 320 is located inside each connection tube 32. The first passages 320 couple the heating section A and the first combustion chamber 43a.

The pair of front and rear tires 31 are attached around the front and rear ends of the furnace core tube 30 such that the heating section A is located between the front and rear tires 31. The front tire 31 is placed on the pair of right and left front rollers 90 so that the front tire 31 can roll thereon. The rear tire 31 is placed on the pair of right and left rear rollers 90 so that the rear tire 31 can roll thereon. As the pair of front and rear tires 31 roll, the furnace core tube 30, namely the tube 3, can rotate about its axis.

(Supply Unit 7)

The supply unit 7 includes a screw feeder 70, a hopper 71, a cutting machine 72, and an upstream end cover 73. The cutting machine 72 is included in the concept of the "cutting unit" of the present invention. The upstream end cover 73 covers the front end of the furnace core tube 30 so as to ensure that the furnace core tube 30 can rotate. The screw feeder 70 extends in the front-rear direction. The rear end (the downstream end in the direction in which the CFRP 10 described below is carried) of the screw feeder 70 is inserted in the tube 3. The hopper 71 is connected to the upper side of the front end of the screw feeder 70. The cutting machine 72 connects to the front side (the upstream side in the direction in which the CFRP 10 described below is carried) of the hopper 71.

(Gas Supply Unit 5, Recovery Unit 6)

The gas supply unit 5 includes a gas supply tube 50. The gas supply tube 50 extends through the upstream end cover 73. The recovery unit 6 includes a tank 60, a downstream end cover 61, a pipe 62, a cyclone filter 63, a pipe 64, a long fiber tank 65, a bag filter 66, a short fiber tank 67, and a blower 68. The cyclone filter 63 is included in the concept of the "classification unit" of the present invention.

The downstream end cover 61 covers the rear end of the furnace core tube 30 so as to ensure that the furnace core tube 30 can rotate. The tank 60 is placed so as to connect to the lower side of the downstream end cover 61. The cyclone filter 63 connects to the downstream side (the downstream side in the direction in which carbon fibers 10S described below are carried) of the tank 60 via the pipe 62. The long fiber tank 65 connects to an opening at the lower end (on the side to which carbon fibers (long fibers) 10Sa described below are carried out) of the cyclone filter 63. The bag filter 66 connects to an opening at the upper end (on the side to which carbon fibers (short fibers) 10Sb described below are carried out) of the cyclone filter 63 via the pipe 64. The bag filter 66 includes a filter cloth 66a. The short fiber tank 67 connects to an opening at the lower end (on the upstream side of the filter cloth 66a; on the side to which the carbon fibers (short fibers) 10Sb described below are carried out) of the bag filter 66. The blower 68 connects to an opening at the upper end (on the downstream side of the filter cloth 66a) of the bag filter 66.

Each of the long fiber tank 65 and the short fiber tank 67 has an opening with a lid (not shown). The operator removes the carbon fibers 10Sa from the long fiber tank 65 through the opening and removes the carbon fibers 10Sb from the short fiber tank 67 through the opening.

(Superheated Steam Generation Unit 2)

The superheated steam generation unit 2 includes the waste heat recovery boiler 20, a recovery unit heating unit 21, and a supply tube 22. The waste heat recovery boiler 20 is placed on the rear side (the downstream side in the direction in which the gas 10G described below flows) of the combustion unit 4. The waste heat recovery boiler 20 includes a housing 200, a pipe 201, and an exhaust cylinder 202. A heating chamber 200a is placed in the housing 200. A plurality of boiler burners 200b and a plurality of boiler air supply tubes 200c are placed in the heating chamber 200a. Fuel gas (e.g., propane gas) and air are supplied to the boiler burners 200b. The pipe 201 is placed in the heating chamber 200a. The pipe 201 meanders in the heating chamber 200a. The exhaust cylinder 202 protrudes from the housing 200. A fourth passage 202a is located inside the exhaust cylinder 202. The fourth passage 202a couples the heating chamber 200a and the outside of the housing 200. A dust collector (specifically, a cyclone filter, not shown) and a suction blower (not shown) are placed in the exhaust cylinder 202.

The recovery unit heating unit 21 includes a pipe 210 and a jacket 211. One end (the upstream end in the direction in which steam described below flows) of the pipe 210 connects to the pipe 201 of the waste heat recovery boiler 20. The jacket 211 covers the tank 60 of the recovery unit 6 from beneath and from the outside. The jacket 211 connects to the other end (the downstream end in the direction in which the steam described below flows) of the pipe 210.

One end (the upstream end in the direction in which superheated steam described below flows) of the supply tube 22 connects to the pipe 201 of the waste heat recovery boiler 20. The supply tube 22 extends through the second combustion chamber 43b. The supply tube 22 meanders in the second combustion chamber 43b. The other end (the downstream end in the direction in which the superheated steam described below flows) of the supply tube 22 extends through the upstream end cover 73.

[Operation of Regeneration Rotary Kiln for Recovering Carbon Fibers]

Operation of the regeneration rotary kiln of the present embodiment for recovering carbon fibers will be described below. The regeneration rotary kiln 1 can separate the CFRP 10 into the combustible gas 10G comprised of a matrix resin and the carbon fibers 10S. The carbon fibers 10S are recovered. The gas 10G is used to heat the CFRP 10 in the regeneration rotary kiln 1. The gas 10G is also used to generate superheated steam in the regeneration rotary kiln 1.

First, the regeneration rotary kiln 1 is started. Specifically, fuel gas and air are supplied to the plurality of first burners 44a and the plurality of second burners 44b to ignite the burners 44a, 44b. That is, the first combustion chamber 43a and the second combustion chamber 43b are heated. The screw feeder 70 and the cutting machine 72 are driven. The furnace core tube 30 is rotated about its axis by a motor (not shown). Nitrogen gas is introduced from the gas supply tube 50 into the furnace core tube 30 through the opening at the front end (the opening at the upstream end in the direction in which the CFRP 10 is carried) of the furnace core tube 30.

The waste heat recovery boiler 20 is driven. Specifically, water is supplied to the pipe 201. Fuel gas and air are supplied to the boiler burners 200b to ignite the boiler burners 200b. That is, the water in the pipe 201 is heated to generate steam. The steam is introduced into the jacket 211 of the recovery unit heating unit 21. The steam is also introduced into the supply tube 22. The steam introduced into the supply tube 22 is heated as it passes through the second combustion chamber 43b (the second burners 44b have already been ignited). Superheated steam is generated at this time. The superheated steam thus generated is introduced into the furnace core tube 30 through the opening at the front end (the opening at the upstream end in the direction in which the CFRP 10 is carried) of the furnace core tube 30.

Next, the CFRP 10 is supplied to the regeneration rotary kiln 1. Specifically, the CFRP 10 is supplied to the screw feeder 70 through the cutting machine 72 and the hopper 71. The CFRP 10 contains a matrix resin and carbon fibers. The CFRP 10 is cut into pieces of a predetermined size by the cutting machine 72. The CFRP 10 is placed into the furnace core tube 30 by the screw feeder 70. The CFRP 10 thus placed into the furnace core tube 30 moves from the front side toward the rear side thereof due to the tilt of the furnace core tube 30 while being shaken by rotation of the furnace core tube 30. While moving, the CFRP 10 (specifically, the cut pieces of the CFRP 10) passes through the heating section A.

The heating section A is contained in the first combustion chamber 43a. The heating section A has been held at a predetermined temperature by the first combustion chamber 43a. The superheated steam has been introduced into the heating section A from its front side (the upstream side in the direction in which the CFRP 10 is carried) through the supply tube 22. Similarly, the nitrogen gas has been introduced into the heating section A from its front side (the upstream side in the direction in which the CFRP 10 is carried) through the gas supply tube 50. The CFRP 10 is therefore heated in the heating section A while being exposed to the superheated steam and the nitrogen gas. The matrix resin in the CFRP 10 is hydrolyzed and pyrolyzed by the water vapor and heat of the superheated steam and the heat of the first combustion chamber 43a. The matrix resin is thus decomposed into a low molecular weight matrix resin and gasified. That is, the CFRP 10 is separated into the gas 10G and the carbon fibers 10S in the heating section A. The gas 10G is introduced from the heating section A into the first combustion chamber 43a through the plurality of first passages 320. The carbon fibers 10S stay in the heating section A.

The carbon fibers 10S staying in the heating section A drop into the tank 60 through the opening at the rear end (the opening at the downstream end in the direction in which the CFRP 10 is carried) of the furnace core tube 30. The carbon fibers 10S having dropped into the tank 60 contain both the carbon fibers 10Sa or long fibers and the carbon fibers 10Sb or short fibers (having a shorter fiber length than the carbon fibers 10Sa). The carbon fibers 10S are carried from the tank 60 to the cyclone filter 63 through the pipe 62 by the blower 68. The cyclone filter 63 classifies the carbon fibers 10S into the carbon fibers 10Sa and the carbon fibers 10Sb by the centrifugal force and gravity. That is, the carbon fibers 10Sa or long fibers are large in mass. The carbon fibers 10S therefore drop into the long fiber tank 65 through the opening at the lower end of the cyclone filter 63. The carbon fibers 10Sb or short fibers are smaller in mass than the carbon fibers 10Sa. The carbon fibers 10Sb are therefore carried to the bag filter 66 through the opening at the upper end of the cyclone filter 63 via the pipe 64 by the blower 68. The carbon fibers 10Sb are filtered out by the filter cloth 66a and drop into the short fiber tank 67.

The gas 10G generated from the matrix resin is combustible. The gas 10G burns in the first combustion chamber 43a. That is, the gas 10G is used as a heat source for heating the CFRP 10, specifically a heat source for hydrolyzing and pyrolyzing the matrix resin.

The temperature of the first combustion chamber 43a is secured by the amount of heat from combustion of the fuel gas by the first burners 44a and the amount of heat from combustion of the gas 10G. As the supply of the gas 10G increases, the flow rate of the fuel gas (the amount of combustion by the first burners 44a) can be reduced accordingly. For example, at least one of the plurality of first burners 44a can be turned off.

The temperature of the first combustion chamber 43a can be adjusted by the amount of combustion by the first burners 44a and the supply of air to the first air supply tubes 45a. For example, the temperature of the first combustion chamber 43a can be increased by increasing the amount of combustion by the first burners 44a. The temperature of the first combustion chamber 43a can be decreased by reducing the amount of combustion by the first burners 44a.

In the case where an oxygen concentration high enough to burn the gas 10G is secured in the first combustion chamber 43a, the temperature of the first combustion chamber 43a can be decreased by increasing the supply of air to the first air supply tubes 45a. The temperature of the first combustion chamber 43a can be increased by reducing the supply of air to the first air supply tubes 45a.

In the case where an oxygen concentration high enough to burn the gas 10G is not secured in the first combustion chamber 43a, the temperature of the first combustion chamber 43a can be increased by increasing the supply of air to the first air supply tubes 45a. The temperature of the first combustion chamber 43a can be decreased by reducing the supply of air to the first air supply tubes 45a.

The gas 10G is introduced from the first combustion chamber 43a into the second combustion chamber 43b through the plurality of second passages 420. The gas 10G (specifically, an unburned part of the gas 10G in the first combustion chamber 43a) is burned in the second combustion chamber 43b. That is, the gas 10G is used as a heat source for heating the supply tube 22, specifically as a heat source for generating superheated steam from steam.

Like the first combustion chamber 43a, the temperature of the second combustion chamber 43b is secured by the amount of heat from combustion of the fuel gas by the second burners 44b and the amount of heat from combustion of the gas 10G. As the supply of the gas 10G increases, the flow rate of the fuel gas (the amount of combustion by the second burners 44b) can be reduced accordingly. For example, at least one of the plurality of second burners 44b can be turned off. Like the first combustion chamber 43a, the temperature of the second combustion chamber 43b can be adjusted by the amount of combustion by the second burners 44b and the supply of air to the second air supply tubes 45b.

The gas 10G is introduced from the second combustion chamber 43b into the heating chamber 200a through the third passage 460. The gas 10G (specifically, an unburned part of the gas 10G in the second combustion chamber 43b) is burned in the heating chamber 200a. That is, the gas 10G is used as a heat source for heating the pipe 201, specifically as a heat source for generating steam from water.

Like the first combustion chamber 43a and the second combustion chamber 43b, the temperature of the heating chamber 200a is secured by the amount of heat from combustion of the fuel gas by the boiler burners 200b and the amount of heat from combustion of the gas 10G. As the supply of the gas 10G increases, the flow rate of the fuel gas (the amount of combustion by the boiler burners 200b) can be reduced accordingly. For example, at least one of the plurality of boiler burners 200b can be turned off. Like the first combustion chamber 43a and the second combustion chamber 43b, the temperature of the heating chamber 200a can be adjusted by the amount of combustion by the boiler burners 200b and the supply of air to the boiler air supply tubes 200c.

Waste gas is discharged from the heating chamber 200a to the outside of the regeneration rotary kiln 1 through the fourth passage 202a. The waste gas contains carbon dioxide etc. generated by combustion of the gas 10G in the first combustion chamber 43a, the second combustion chamber 43b, and the heating chamber 200a.

[Functions and Effects]

Functions and effects of the regeneration rotary kiln of the present embodiment will be described below. According to the regeneration rotary kiln 1 of the present embodiment, the carbon fibers 10S can be continuously recovered. The CFRP 10 can be stirred by rotation of the tube 3. The recovered carbon fibers 10S can therefore have uniform quality.

In the heating section A, the CFRP 10 is heated while being exposed to superheated steam. The matrix resin in the CFRP 10 is hydrolyzed and pyrolyzed by the water vapor and heat of the superheated steam and the heat of the first combustion chamber 43a. The matrix resin is thus decomposed into a low molecular weight matrix resin and gasified. The gas 10G thus generated is combustible. The combustible gas 10G is introduced from the heating section A into the first combustion chamber 43a through the plurality of first passages 320 and burns in the first combustion chamber 43a. The heating section A in the tube 3 can be heated by heat from the combustion of the gas 10G. According to the regeneration rotary kiln 1 of the present embodiment, the combustible gas 10G generated from the matrix resin can thus be used to heat the CFRP 10. Cost for heating the CFRP 10 can therefore be reduced.

The combustible gas 10G remaining unburned in the first combustion chamber 43a (specifically, an unburned part of the gas) is introduced from the first combustion chamber 43a into the second combustion chamber 43b and is burned in the second combustion chamber 43b. Heat from the combustion of the gas 10G is used to generate superheated steam. That is, the heat from the combustion of the gas 10G is used in at least a part of a superheated steam generation process of "water→boiling water→wet steam→saturated steam→superheated steam." According to the regeneration rotary kiln 1 of the present embodiment, the gas 10G introduced from the first combustion chamber 43a into the second combustion chamber 43b can thus be used to generate superheated steam. Cost for generating the superheated steam can therefore be reduced. Moreover, the amount of unburned combustible gas 10G can be reduced. The proportion of the combustible gas 10G in the waste gas (specifically, the waste gas discharged from the heating chamber 200a to the outside of the regeneration rotary kiln 1 through the fourth passage 202a) can also be reduced. This can suppress environmental pollution from the combustible gas.

The supply tube 22 is placed so as to meander in a wavy line pattern in the second combustion chamber 43b. This facilitates heating of steam in the supply tube 22 by heat of the second combustion chamber 43b through a peripheral sidewall (wall) of the supply tube 22.

The first combustion chamber 43a and the second combustion chamber 43b communicate with each other, but are independent of each other. Specifically, the first combustion chamber 43a and the second combustion chamber 43b are separated from each other by the partition wall 42 having the plurality of second passages 420. The first combustion chamber 43a and the second combustion chamber 43b can therefore be controlled independently of each other. For example, the temperature in the first combustion chamber 43a and the temperature in the second combustion chamber 43b can be individually controlled.

According to the regeneration rotary kiln 1 of the present embodiment, steam can be generated from water in the waste heat recovery boiler 20 by using heat from combustion of the gas 10G (specifically, an unburned part of the gas 10G in the second combustion chamber 43b) introduced from the second combustion chamber 43b through the third passage 460. Superheated steam can be generated from the steam in the supply tube 22 by using heat of the second combustion chamber 43b. Cost for generating the superheated steam can therefore be reduced. Moreover, the amount of unburned gas 10G in the second combustion chamber 43b can also be reduced.

According to the regeneration rotary kiln 1 of the present embodiment, the first combustion chamber 43a and the second combustion chamber 43b are placed next to each other with the partition wall 42 interposed therebetween. The temperature of the gas 10G is therefore less likely to decrease when the gas 10G is introduced from the first combustion chamber 43a into the second combustion chamber 43b. The first combustion chamber 43a can be heated by heat from combustion of the gas 10G in the second combustion chamber 43b. That is, the heating section A can be heated by the heat from the combustion of the gas 10G in the second combustion chamber 43b via the first combustion chamber 43a. Moreover, installation space for the regeneration rotary kiln 1 can be reduced.

According to the regeneration rotary kiln 1 of the present embodiment, nitrogen gas is introduced from the gas supply tube 50 into the furnace core tube 30. This can suppress entry of air (oxygen) into the tube 3. That is, oxidization of the carbon fibers 10S in the tube 3 can be suppressed. Since the nitrogen gas is added to the superheated steam, adhesion (bonding) between the recovered carbon fibers 10S and the matrix resin can be improved.

According to the regeneration rotary kiln 1 of the present embodiment, the CFRP 10 can be reliably exposed to the nitrogen gas from the beginning of the processing of the CFRP 10 in the heating section A. Accordingly, adhesion (bonding) between the recovered carbon fibers 10S and the matrix resin can be reliably improved.

According to the regeneration rotary kiln 1 of the present embodiment, the gas supply tube 50 introduces nitrogen gas into the furnace core tube 30 through the opening at the front end (the opening at the upstream end in the direction in which the CFRP 10 is carried) of the furnace core tube 30. The carbon fibers 10S are therefore less likely to scatter in the furnace core tube 30 as compared to the case where the nitrogen gas is introduced into the furnace core tube 30 through the opening at the rear end (the opening at the downstream end in the direction in which the CFRP 10 is carried) of the furnace core tube 30. Moreover, the carbon fibers 10S having passed through the heating section A are unlikely to be forced back into the heating section A in the furnace core tube 30 by the flow of the nitrogen gas. That is, the carbon fibers 10S having passed through the heating section A are not heated again in the heating section A. Thermal history of the recovered carbon fibers 10S is therefore less likely to vary, and the carbon fibers 10S can have uniform quality.

According to the regeneration rotary kiln 1 of the present embodiment, superheated steam and nitrogen gas are supplied in the same direction. The flow of the superheated steam and the flow of the nitrogen gas do not hinder each other. The carbon fibers 10S having passed through the heating section A are therefore less likely to scatter in the furnace core tube 30. Accordingly, the CFRP 10 can be reliably processed. This can reliably improve adhesion (bonding) of the carbon fibers 10S.

According to the regeneration rotary kiln 1 of the present embodiment, the jacket 211 covers the tank 60 from beneath and from the outside. This can suppress condensation on the carbon fibers 10S and on the inner surface of the tank 60. That is, adhesion of the carbon fibers 10S to be recovered to the inner surface of the tank 60 due to condensation can be suppressed. This can improve capability of carrying the carbon fibers 10S to be recovered.

According to the regeneration rotary kiln 1 of the present embodiment, the cutting machine 72 is placed on the front side (the upstream side in the direction in which the CFRP 10 is carried) of the hopper 71. The CFRP 10 can therefore be cut into pieces of a size suitable for being placed into the tube 3. Moreover, the size of the CFRP 10 can be adjusted by cutting. For example, cutting the CFRP 10 into pieces of a fixed size can achieve uniform processing of the CFRP 10 in the tube 3. This can stabilize quality of the recovered carbon fibers 10S.

According to the regeneration rotary kiln 1 of the present embodiment, the recovery unit 6 includes the cyclone filter 63. The carbon fibers 10S recovered from the tube 3 can therefore be classified into the carbon fibers 10Sa or long fibers and the carbon fibers 10Sb or short fibers. That is, the carbon fibers 10S can be classified by the fiber length. This eliminates the need to classify the carbon fibers 10S again for reuse.

Second Embodiment

A regeneration rotary kiln of the present embodiment is different from that of the first embodiment in the following points. Superheated steam is generated from water in the supply tube. The superheated steam generation unit does not include the waste heat recovery boiler and the recovery unit heating unit. The first combustion chamber and the second combustion chamber are separated from each other. Superheated steam and nitrogen gas are supplied into the furnace core tube through the opening at the rear end (the downstream end in the direction in which the CFRP is carried) of the furnace core tube. The cyclone filter is not placed in the recovery unit. Only the differences will be described below.

Figure 2:
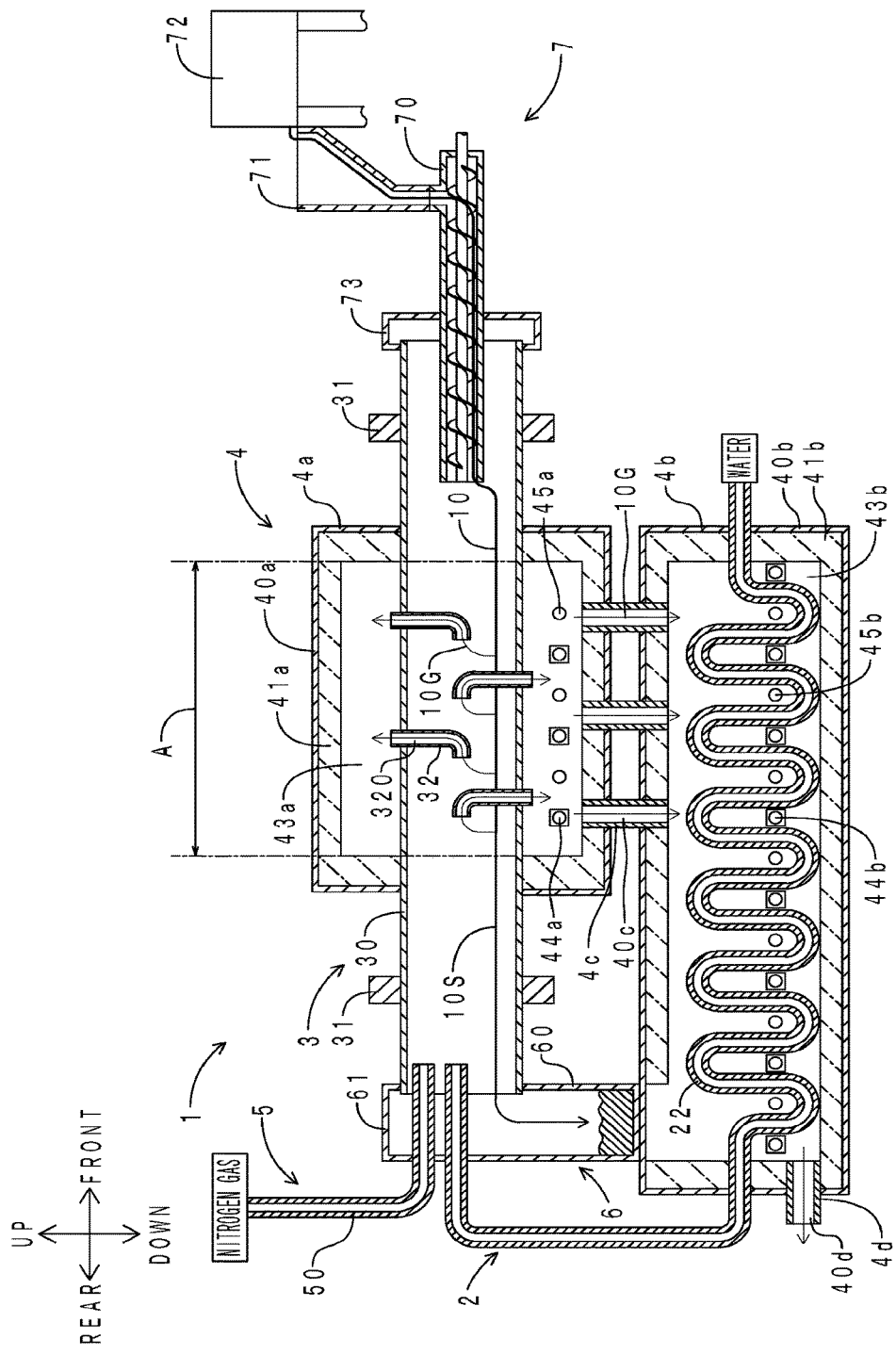
FIG. 2 is a longitudinal section of a regeneration rotary kiln according to a second embodiment.

FIG. 2 is a longitudinal section of the regeneration rotary kiln of the present embodiment. Those portions corresponding to FIG. 1 are denoted with the same reference characters. As shown in FIG. 2, the combustion unit 4 includes a first unit 4a, a second unit 4b, a plurality of connection cylinders 4c, and an exhaust cylinder 4d.

The first unit 4a includes an outer wall 40a, a thermal insulation material 41a, a first combustion chamber 43a, a plurality of first burners 44a, and a plurality of first air supply tubes 45a. The outer wall 40a has the shape of a rectangular box. The thermal insulation material 41a is stacked on the inner side of the outer wall 40a. The first combustion chamber 43a is defined inside the thermal insulation material 41a. The plurality of first burners 44a and the plurality of first air supply tubes 45a are placed in the first combustion chamber 43a.

The second unit 4b is placed below the first unit 4a at a predetermined interval therebetween. The second unit 4b includes an outer wall 40b, a thermal insulation material 41b, a second combustion chamber 43b, a plurality of second burners 44b, and a plurality of second air supply tubes 45b. The outer wall 40b has the shape of a rectangular box. A rear part of an upper wall of the outer wall 40b contacts a tank 60. The thermal insulation material 41b is stacked on the inner side of the outer wall 40b (specifically, the outer wall 40b other than the rear part of the upper wall thereof). The second combustion chamber 43b is defined inside the thermal insulation material 41b. The plurality of second burners 44b and the plurality of second air supply tubes 45b are placed in the second combustion chamber 43b.

Each of the plurality of connection cylinders 4c is placed between the first unit 4a and the second unit 4b. A second passage 40c is located inside each connection cylinder 4c. The second passages 40c couple the first combustion chamber 43a and the second combustion chamber 43b in the up-down direction. The exhaust cylinder 4d protrudes from the second unit 4b. A third passage 40d is located inside the exhaust cylinder 4d. The third passage 40d couples the second combustion chamber 43b to the outside of the outer wall 40b. A dust collector (specifically, a cyclone filter, not shown) and a suction blower (not shown) are placed in the exhaust cylinder 4d.

A superheated steam generation unit 2 includes a supply tube 22. Water is introduced from one end (the upstream end in the direction in which superheated steam flows) of the supply tube 22. The supply tube 22 extends through the second combustion chamber 43b. The supply tube 22 meanders in the second combustion chamber 43b. The other end (the downstream end in the direction in which the superheated steam flows) of the supply tube 22 extends through a downstream end cover 61. The supply tube 22 is inserted in a furnace core tube 30 through an opening at the rear end (the downstream end in the direction in which a CFRP 10 is carried) of the furnace core tube 30.

A gas supply unit 5 includes a gas supply tube 50. The gas supply tube 50 extends through the downstream end cover 61. The gas supply tube 50 is inserted in the furnace core tube 30 through the opening at the rear end (the downstream end in the direction in which the CFRP 10 is carried) of the furnace core tube 30. The tank 60 of a recovery unit 6 has an opening with a lid (not shown). The operator removes carbon fibers 10S from the tank 60 through the opening.

Regarding those portions having the same configuration, the regeneration rotary kiln of the present embodiment have functions and effects similar to those of the regeneration rotary kiln of the first embodiment. As in the regeneration rotary kiln 1 of the present embodiment, superheated steam and nitrogen gas may be introduced into the furnace core tube 30 through the opening at the rear end (the downstream end in the direction in which the CFRP 10 is carried) of the furnace core tube 30. As in the regeneration rotary kiln 1 of the present embodiment, the first unit 4a (the first combustion chamber 43a) and the second unit 4b (the second combustion chamber 43b) may be placed separately. This increases flexibility in arrangement of the first combustion chamber 43a and the second combustion chamber 43b.

According to the regeneration rotary kiln 1 of the present embodiment, the tank 60 can be heated by heat of the second combustion chamber 43b. This can suppress condensation on the carbon fibers 10S and on the inner surface of the tank 60. That is, adhesion of the carbon fibers 10S to be recovered to the inner surface of the tank 60 due to condensation can be suppressed. This can improve capability of carrying the carbon fibers 10S to be recovered. Moreover, this eliminates the need for the recovery unit heating unit 21 shown in FIG. 1 in the superheated steam generation unit 2.

According to the regeneration rotary kiln 1 of the present embodiment, superheated steam is generated from water in the section of the supply tube 22 which is contained in the second combustion chamber 43b. This eliminates the need for the waste heat recovery boiler 20 shown in FIG. 1 in the superheated steam generation unit 2.

<Others>

The embodiments of the regeneration rotary kiln of the present invention are described above. However, embodiments are not particularly limited to those described above. The present invention can be carried out in various modified or improved forms that can be implemented by those skilled in the art.

In the regeneration rotary kiln of the present invention, nitrogen gas is supplied into the furnace core tube 30. However, inert gas (argon, helium, etc.) may be supplied into the furnace core tube 30. Alternatively, carbon dioxide may be supplied into the furnace core tube 30. In this case as well, adhesion (bonding) between the carbon fibers and the matrix resin can be improved as in the case where nitrogen gas is supplied. Waste gas discharged from the exhaust cylinder 202 shown in FIG. 1 and the exhaust cylinder 4d shown in FIG. 2 contain carbon dioxide. This carbon dioxide may be supplied into the furnace core tube 30. This can reduce cost required to supply nitrogen gas. Moreover, this eliminates the need for the gas supply unit 5.

Superheated steam or nitrogen gas may not be supplied in one direction, namely from either the front end (the upstream side in the direction in which the CFRP 10 is carried) or the rear end (the downstream side in the direction in which the CFRP 10 is carried) of the furnace core tube 30. Superheated steam and nitrogen gas may be supplied in both directions. The part of the supply tube 22 which extends in the furnace core tube 30 may have a plurality of introduction holes so that superheated steam is introduced into the furnace core tube 30 through the plurality of introduction holes. The part of the gas supply tube 50 which extends in the furnace core tube 30 may also have a plurality of introduction holes so that nitrogen gas is introduced into the furnace core tube 30 through the plurality of introduction holes. The supply tube 22 and the gas supply tube 50 may be placed so as to face each other in the front-rear direction (the axial direction) in the furnace core tube 30.

In the regeneration rotary kiln of the present embodiment, the first combustion chamber 43a is placed on the second combustion chamber 43b. However, the first combustion chamber 43a may be placed below the second combustion chamber 43b. The first combustion chamber 43a and the second combustion chamber 43b may be placed next to each other in the lateral direction. A plurality of second combustion chambers 43b may be provided.

The second combustion chamber 43b may cover the first combustion chamber 43a from the outside. This facilitates heating of the first combustion chamber 43a by the heat of the second combustion chamber 43b, and improves heat retention capability of the first combustion chamber 43a.

The regeneration rotary kiln 1 and the waste heat recovery boiler 20 may be placed at separate locations. That is, steam generated by a boiler of a separate facility may be introduced into the supply tube 22 to generate superheated steam.

Town gas, liquefied petroleum gas, coke oven gas (COG), etc. may be used as fuel gas for the first burners 44a, the second burners 44b, and the boiler burners 200b.

The boiler burners 200b and the boiler air supply tubes 200c may not be placed in the heating chamber 200a of the waste heat recovery boiler 20 shown in FIG. 1. In this case, water in the pipe 201 is heated by heat that is retained by the gas 10G introduced from the second combustion chamber 43b into the heating chamber 200a through the third passage 460. This can reduce cost required to place the boiler burners 200b and the boiler air supply tubes 200c, and can also simplify the structure of the waste heat recovery boiler 20.

A plurality of cyclone filters 63 shown in FIG. 1 may be provided. For example, another cyclone filter 63 may be connected to the pipe 64. The blower 68 is connected to the most downstream cyclone filter 63. This allows the carbon fibers 10S to be classified into a larger number of groups by the fiber length. A classifying device other than the cyclone filter 63 may be placed as the classification unit. For example, a vibrating screen filter that performs classification with a net may be placed as the classification unit.

The jacket 211 shown in FIG. 1 may be placed on at least one of the pipe 62, the cyclone filter 63, the pipe 64, the long fiber tank 65, the bag filter 66, and the short fiber tank 67. This can suppress condensation.

The number of second passages 420 in FIG. 1, the number of third passages 460 in FIG. 1, and the number of second passages 40c in FIG. 2 are not particularly limited. For example, only one second passage 420 and one second passage 40c may be provided. A plurality of third passages 460 may be provided.

DESCRIPTION OF THE REFERENCE NUMERALS

1: Regeneration Rotary Kiln
2: Superheated Steam Generation Unit, 20: Waste Heat Recovery Boiler, 200: Housing, 200a: Heating Chamber, 200b: Boiler Burner, 200c: Boiler Air Supply Tube, 201: Pipe, 202: Exhaust Cylinder, 202a: Fourth Passage, 21: Recovery Unit Heating Unit, 210: Pipe, 211: Jacket, 22: Supply Tube
3: Tube, 30: Furnace Core Tube, 31: Tire, 32: Connection Tube, 320: First Passage
4: Combustion Unit, 4a: First Unit, 4b: Second Unit, 4c: Connection Cylinder, 4d: Exhaust Cylinder, 40: Outer Wall: 40a: Outer Wall, 40b: Outer Wall, 40c: Second Passage, 40d: Third Passage, 41: Thermal Insulation Material, 41a: Thermal Insulation Material, 41b: Thermal Insulation Material, 42: Partition Wall, 420: Second Passage, 43a: First Combustion Chamber, 43b: Second Combustion Chamber, 44a: First Burner, 44b: Second Burner, 45a: First Air Supply Tube, 45b: Second Air Supply Tube, 46: Connection Cylinder, 460: Third Passage
5: Gas Supply Unit, 50: Gas Supply Tube
6: Recovery Unit, 60: Tank, 61: Downstream End Cover, 62: Pipe, 63: Cyclone Filter (Classification Unit), 64: Pipe, 65: Long Fiber Tank, 66: Bag filter, 66a: Filter Cloth, 67: Short Fiber Tank, 68: Blower
7: Supply Unit, 70: Screw Feeder, 71: Hopper, 72: Cutting Machine (Cutting Unit), 73: Upstream End Cover
10: CFRP, 10G: Gas, 10S: Carbon Fiber, 10Sa: Carbon Fiber (Long Fiber), 10Sb: Carbon Fiber (Short Fiber), 90: Roller
A: Heating Section

The invention claimed is:

1. A regeneration rotary kiln, comprising:
a superheated steam generation unit that generates superheated steam;
a tube capable of rotating about its axis and having a heating section where, while the superheated steam is being supplied thereto, carbon fiber reinforced plastic containing a matrix resin and carbon fibers is heated to generate combustible gas from the matrix resin to extract the carbon fibers from the carbon fiber reinforced plastic;
a first combustion chamber supplied with a fuel gas and air that is placed outside the tube and that partially burns the combustible gas introduced from the heating section with the fuel gas to heat the heating section; and
a second combustion chamber supplied with a fuel gas and air that burns a portion of the remaining unburned combustible gas introduced from the first combustion chamber with the fuel gas to supply heat for generating the superheated steam, wherein
the regeneration rotary kiln recovers the carbon fibers from the carbon fiber reinforced plastic wherein the superheated steam generation unit has a waste heat recovery boiler supplied with a fuel gas and air that heats water to generate steam, and a supply tube that couples the waste heat recovery boiler and the tube via the second combustion chamber and that heats the steam to generate the superheated steam, the steam in the supply tube is heated by the heat of the second combustion chamber which is transmitted through a wall of the supply tube, and the waste heat recovery boiler burns the remaining unburned combustible gas introduced from the second combustion chamber with the fuel gas to heat the water to generate the steam.

2. The regeneration rotary kiln according to claim 1, wherein the supply of fuel gas is decreased or stopped and the waste heat recovery boiler heats the water by heat from burning of the gas introduced from the second combustion chamber to generate the steam.

3. The regeneration rotary kiln according to claim 1, wherein
the second combustion chamber is placed next to the first combustion chamber.

4. The regeneration rotary kiln according to claim 1, further comprising:
a gas supply unit that supplies nitrogen gas into the tube.

5. The regeneration rotary kiln according to claim 1, further comprising:
a recovery unit that is placed on a downstream side of the tube and that recovers the carbon fibers extracted in the tube, wherein the superheated steam generation unit heats the recovery unit.

6. The regeneration rotary kiln according to claim 5, wherein
the recovery unit comprises a classification unit that classifies the carbon fibers.

7. The regeneration rotary kiln according to claim 1, further comprising:
a cutting unit that is placed on an upstream side of the tube and that cuts the carbon fiber reinforced plastic into pieces of a predetermined size.

* * * * *